May 28, 1929.  E. R. VONTOBEL  1,714,743

CAM ACTUATED CONTACT LEVER MECHANISM

Filed April 7, 1928

INVENTOR.
ERNST R. VONTOBEL

Patented May 28, 1929.

1,714,743

UNITED STATES PATENT OFFICE.

ERNST RUDOLF VONTOBEL, OF OERLIKON, SWITZERLAND, ASSIGNOR TO THE FIRM MASCHINENFABRIK OERLIKON, OF OERLIKON, SWITZERLAND, A CORPORATION OF SWITZERLAND.

CAM-ACTUATED CONTACT-LEVER MECHANISM.

Application filed April 7, 1928, Serial No. 268,304, and in Germany April 11, 1927.

This invention relates to a cam-actuated contact lever mechanism, particularly for electric car controllers, and aims at enabling various switching operations to be performed by, in part, the same lever contacts.

This can, according to the invention be achieved for example by the axial displacement of the cams, in such a way that by such displacement, the contact levers are brought within reach of differently shaped cams.

In order to facilitate comprehension of the invention, a typical embodiment thereof will hereinafter be more fully described with reference to the accompanying drawings.

Figure 1:
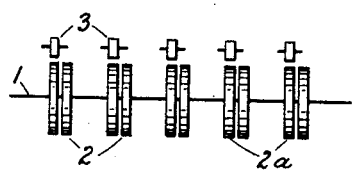
Figure 2:
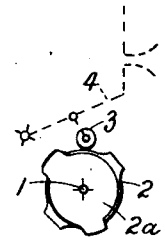

Figs. 1 and 2 of said drawings represent diagrammatically, in front and side elevation, a shaft 1 which is provided with cams 2 and 2ª and which, on being turned in the direction of switching-on, is displaced in the axial direction by means of the arrangement hereinafter described, so that the cams 2 are brought into the planes of rollers 3 of contact levers 4 (indicated by dotted lines in Fig. 2), whereby, on switching-on for example a series-parallel connection of the motors takes place whilst, on switching-off, the shaft 1 and the cams fixed thereon are returned to their former position, so that now the cams 2ª come into action, with the result that a different switch connection, or interruption of the current, takes place.

Figure 3:
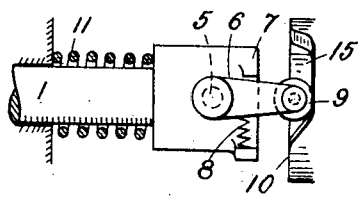
Figure 4:
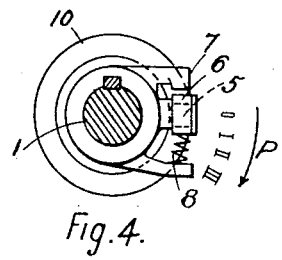

The axial displacement of the shaft 1 may, for example, be effected by means of the arrangement shown in Figs. 3 and 4, wherein 6 denotes a pawl extending axially relatively to the shaft 1 and rotatably mounted on a pivot 5 on and transverse to the shaft 1 and located between a stop 7 and a spring 8. The pawl 6 is provided with a roller 9 bearing on a track 10, provided with a recess 15. When the shaft 1 turns out of the zero position indicated by O in Fig. 4 in the direction of the arrow P, into one of the positions I, II or III, the roller 9 rises out of the recess 15 onto the projecting portion of the track 10, and displaces the shaft 1 against the force of the spring 11. On reversing the shaft 1 the pawl 6 turns around its pivot 5 towards the spring 8, so that the shaft springs back in the axial direction under the action of the spring 11. In the zero position, the pawl 6 is pressed once more against the stop 7 by the spring 8.

If the connection of the contacts it to be established on both sides of the zero position, a pawl 6 can be provided for each direction of rotation, these pawls running on guides 10 of different diameters, and each track then moving the shaft only so far as it must be turned in the direction in question.

Accordingly, for example in the case of a car controller, the normal series and parallel connection of the motors can be effected in one axial position of the cams in the travelling circuit, whilst by reversing the handle into a certain position, the changing of the cams prepares for switching-on the brakes, so that the further reverse movement in the direction of the zero position applies the brakes. It is also conceivable that a certain resistance staging can be employed when switching-on the motors, whereas, on switching-off, a different arrangement, as regards the number and value of the resistance stages can be provided.

A further application to car controllers is for the purpose of establishing a normal series-parallel connection in switching-on. On the cams being changed over into the parallel positions, the possibility of regulation is retained until the first parallel position is reached, further switching-back or a change of the cams into series position, causing switching-off.

It is obvious that a large number of other switching combinations is also possible according to the invention. The simplest of these is that switching-off alone is effected in one or more definite positions, in that the pre-arranged cam disc is unprovided with tappets in the travelling positions. For this contingency it is advisable to arrange that the automatic shifting of the cams during the change in the direction of turning can place in only one of such directions (e. g. for travelling), whereas in the other direction (e. g. braking) no provision is made for changing the cams, in order to enable the braking current to be regulated.

In order to ensure that the motors will be braked in any event, independently of the axial position of the cams, the tappets needed for switching-on the brakes may also be provided on all the cams. If, according to the connection intended to be made by changing the cams, an interruption of the current is to take place, this takes place in a relatively rapid manner, all the switched-on contacts taking part in the interruption. The advantage of this arrangement consists chiefly in that no unnecessary making and breaking of circuits has to be effected on reversing.

I claim:—

1. In a cam-actuated contact mechanism, especially for electric car controllers, a contact lever, an axially displaceable rotary shaft, a pair of cams on said shaft alternatively actuating said lever, a pawl pivoted transversely on and extending axially to said shaft, a recessed track borne against by said pawl, and a spring thrusting said shaft axially towards said track.

2. In a cam-actuated contact mechanism especially for electric car controllers, a contact lever, an axially displaceable rotary shaft, a pair of cams on said shaft alternatively actuating said lever, a pawl pivoted transversely on and extending axially to said shaft, a stop on said shaft on one side of said pawl, a spring bearing against the other side of said pawl, a recessed track borne against by said pawl, and a spring thrusting said shaft axially towards said track.

In testimony whereof, I affix my signature.

ERNST RUDOLF VONTOBEL.